（12）United States Patent
Stech

(10) Patent No.: US 6,425,427 B1
(45) Date of Patent: Jul. 30, 2002

(54) ON-AXLE TIRE INFLATION SYSTEM

(75) Inventor: Clyde G. Stech, Weimar, TX (US)

(73) Assignee: Innovative Transportation Products, Inc., Dallas, TX (US)

( * ) Notice: Subject to any disclaimer, the term of this patent is extended or adjusted under 35 U.S.C. 154(b) by 0 days.

(21) Appl. No.: 09/714,056

(22) Filed: Nov. 16, 2000

Related U.S. Application Data

(63) Continuation-in-part of application No. 09/347,680, filed on Jul. 2, 1999, now abandoned.

(51) Int. Cl.[7] .......................... B60C 23/10; B60C 29/00
(52) U.S. Cl. ....................................... 152/417; 152/415
(58) Field of Search ................................ 152/415, 416, 152/417

(56) References Cited

U.S. PATENT DOCUMENTS

| | | | | |
|---|---|---|---|---|
| 4,387,931 A | * | 6/1983 | Bland | 152/416 |
| 4,685,501 A | * | 8/1987 | Williams | 152/417 |
| 5,094,263 A | * | 3/1992 | Hurrell, II et al. | 152/416 |
| 5,377,736 A | * | 1/1995 | Stech | 152/417 |
| 5,584,949 A | * | 12/1996 | Ingram | 152/417 |
| 5,769,979 A | * | 6/1998 | Naedler | 152/417 |
| 6,105,645 A | * | 8/2000 | Ingram | 152/415 |
| 6,145,559 A | * | 11/2000 | Ingram, II | 152/417 |

* cited by examiner

Primary Examiner—S. Joseph Morano
Assistant Examiner—Jason R. Bellinger
(74) Attorney, Agent, or Firm—Jackson Walker LLP

(57) ABSTRACT

A vehicle air supply system (200) providing pressurized air from an axle (12) of a vehicle to rotating tires to maintain a desired pneumatic pressure. The air supply system is adapted to be sealingly disposed within the hollow axle of the vehicle, having a rotary union (RU) disposed therein protecting the rotary union from external conditions such as oil leaks or brake shavings. The air supply system includes an axle plug assembly (300) which is seated within the hollow axle (12), and then having resilient members expanded therewithin to provide an air tight seal. The axle plug assembly includes a slidable piston member (260) is axially movable within a plug assembly bolt (282) to facilitate adapting the device to vehicles having different axle lengths. A graphite seal (250) is provided to minimize the friction between a rotating shaft coupled to the oil cap (202), and the stationary axle plug assembly.

16 Claims, 7 Drawing Sheets

ON-AXLE TIRE INFLATION SYSTEM

This is a Continuation in Part of commonly assigned co-pending patent application Ser. No. 09/347,680 entitled "On Axle Tire Inflation System" filed Jul. 2, 1999, now abandoned the teachings of which are incorporated herein by reference.

BACKGROUND OF THE INVENTION

1. Field of the Invention

The present invention relates to on-axle tire inflation systems, and more particularly to an on-axle tire inflation system utilizing an axle and oil cap assembly air distribution system for trucks and other vehicles.

2. Description of the Related Art

One problem associated with pneumatic tires, especially in tractor trailer systems, involves maintaining proper or appropriate tire air pressure. A low pressure situation in a tire can often go undetected for a long period of time. While it is prudent to periodically check tire inflation pressure with an air pressure gauge, such checks are sporadic at-best. A low pressure tire can cause many problems, as can, a high pressure tire.

The concept of providing an on-axle tire inflation system, or what is known as a central tire inflation system (CTIS) or automatic tire inflation system (ATIS), is well known in the art. Such systems remotely or automatically inflate a pneumatic tire rotatably mounted onto the axle of a vehicle via an air distribution system. Typically, an on-board source of pressurized air, such as compressed air from the vehicle air brake compressor and/or compressed air reservoir, is used to fill the tire and maintain tire pressure. In this manner, the pneumatic tire may be inflated without the need to remove the tire from the axle. Some systems may also provide for the deflation of the tire or air pressure monitoring.

Such on-axle tire inflation systems have been incorporated into many types of vehicles such as tractor-trailers and off-road vehicles. By incorporating such systems into the vehicle, tire pressure associated problems may be alleviated. These systems usually include a rotary union coupling air from a fixed member to a member rotating with the wheels. These rotary unions are key components and often subject to premature failure.

However, such prior art systems are generally complicated and/or cumbersome. Additionally, in the case of truck trailers, most truck trailers are provided with a lubrication compartment at the end of the axle for containing lubricant for the wheel bearings. Such systems may include an oil sight glass and an oil plug centered on the site glass for filling and inspecting the lubricant level in the lubrication compartment. A tire inflation system must therefore also incorporate or accommodate such a lubrication system.

Some prior art solutions also fixe critical components outside the hubcap thereby exposing these components making them susceptible to damage and requiring unnecessary maintenance and repair. An effective automatic tire inflation system reduces tire maintenance. However, it is counter productive to install an inflation system that creates additional maintenance and/or repair. There is desired an improved tire inflation system that has an improved rotary union, is easy to install and requires little maintenance.

SUMMARY OF THE INVENTION

The present invention achieves technical advantages as a tire inflation system having a rotary union seated and protected in a hollow axle, which system is easily mounted, and required little maintenance.

In a preferred embodiment thereof, the present invention is a tire inflation system for a vehicle having pneumatic tires mounted onto a hollow axle. The tire inflation system includes a source of compressed air, coupled to a hollow axle, an air interface device having a rotary union, and a oil cap assembly adapted to carry at least one tire. The air interface system is advantageously adapted to have the rotary union protected within the hollow axle to protect this key component from outside elements and failures, such as oil leaks and brake dust. A unique wedge mechanism secures the air interface system against the inner wall of the hollow axle, providing for quick installation and maintaining integrity.

BRIEF DESCRIPTION OF THE DRAWINGS

The above-mentioned and other features and advantages of this invention will be better understood by reference to the following description of embodiments of the invention taken in conjunction with the accompanying drawings, wherein.

Corresponding reference characters indicate corresponding parts throughout the several views. The exemplification set out herein illustrate a preferred embodiment of the invention, in one form, and such exemplification is not to be construed as limiting the scope of the invention in any manner.

DETAILED DESCRIPTION OF THE INVENTION

Figure 1:
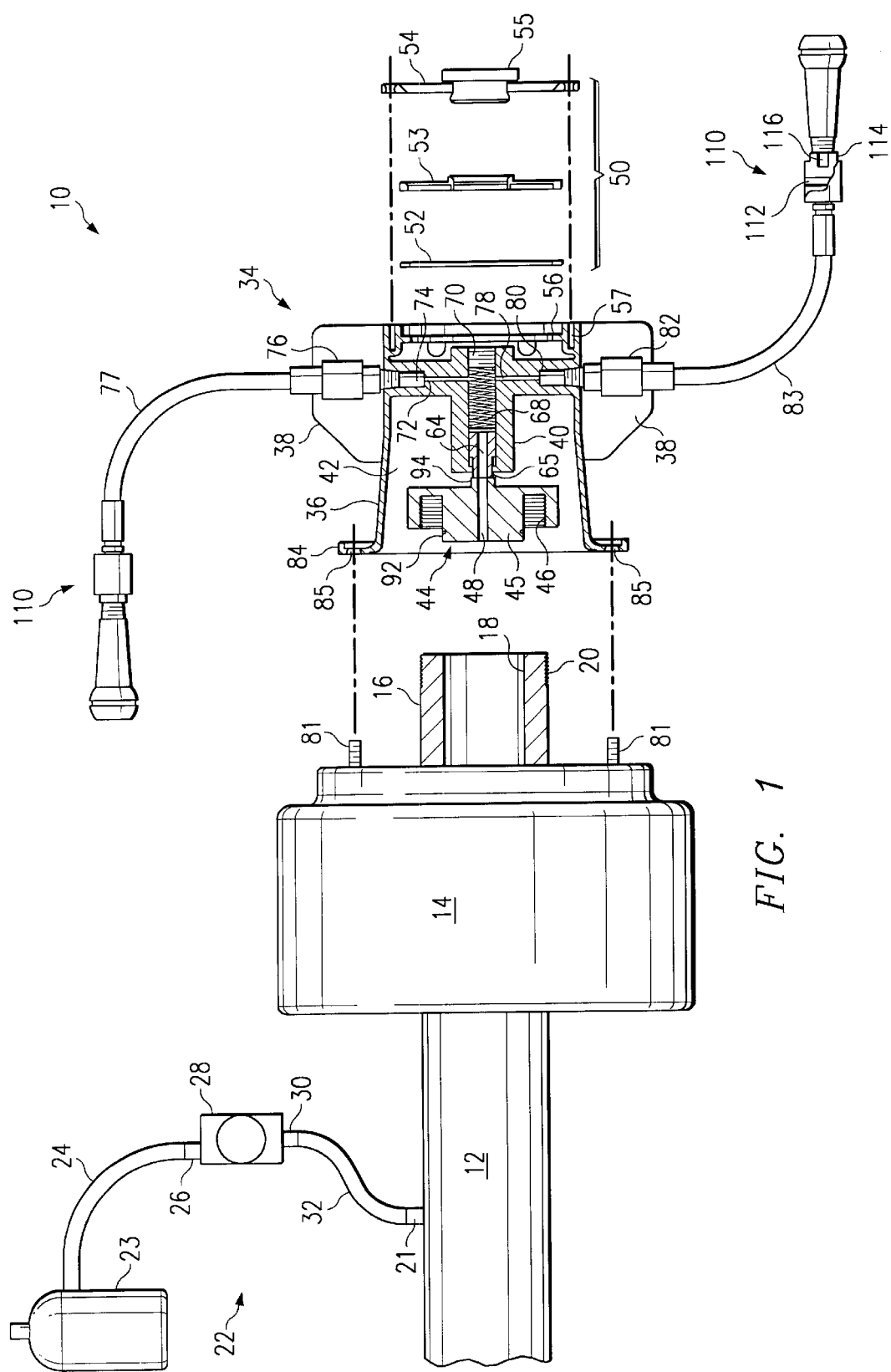
FIG. 1 is a front plan view of one side of an axle and a sectional view of a oil cap assembly that is mountable with respect to the axle in accordance with a first preferred embodiment of the present invention.

Referring now to the drawings and more particularly to FIG. 1, there is shown one side of a vehicle axle, generally designated 12, having a rotor 14 or the like fixedly mounted thereon and internal bore or hollow 18. Threads, indicated at 20, are also provided at end 16 of axle 14. Axle 14 is a depiction of one end of a conventional axle of the type typically provided on trailers of tractor-trailer rigs (not shown). However, it should be appreciated that the present invention is not limited to tractor-trailers, but may be applied to any axle/pneumatic tire vehicle.

Coupled to axle 12 via fitting 21 is air supply system 22 that provides pressurized air from a remote air tank or reservoir 23 to bore 18 of axle 12. Tank 23 represents an on-board source of pressurized air such as compressed air from the vehicle air brake compressor and/or compressed air reservoir. However, it should be understood that the source of pressurized air is not limited to these examples, and could be any type of on-board compressed air source or external compressed air source with the appropriate coupling interface. Air supply system 22 includes incoming air supply line or conduit 24 which is in fluid communication with remote air tank or reservoir 23 or other source of pressurized air. Incoming air supply line 24 is coupled to the inlet of on/off valve 26 such as a ball valve which is in turn coupled to the inlet of air regulator 28.

Air regulator 28 is adjustable either manually or automatically, to provide air at a regulated pressure. At the outlet of air regulator 28 is air control orifice 30 that is coupled to axle air line 32 which is in turn coupled to fitting 21 affixed to axle 12. Thus, incoming pressurized air is directed through line 24, into air regulator 28, and then into bore 18 of axle 12 via line 32 at a pressure determined by air regulator 28 and air control orifice 30 and suitable for inflation pressure of a pneumatic tire.

Mounted to axle 12 and rotor 14 is oil cap assembly which carries at least one (1) pneumatic tire (not shown) and preferably two (2) pneumatic tires (not shown) mounted thereon in a conventional side-by-side manner as is typical in tractor-trailer rigs. Oil cap assembly 34 generally includes rim body 36, bearing or rotary union seal cap 44, and lubrication retention/seal assembly 50. Retention/seal assembly 50 includes gasket 52, sight glass 53, retainer ring 54, and plug 55 which together provide sealing for lubrication within rim body 36 and a visual inspection of the lubrication level therein. Gasket 52 is generally annular in shape and rests upon annular surface or ledge 56 of rim body 36. Disposed over gasket 52 is sight glass 53 for allowing visual inspection of the lubrication level. Retainer ring 54 is disposed over sight glass 53 and is secured to rim body 36 via -screws (not shown) that are received in threaded bores 57. Retainer ring 54 also holds plug 55.

Figure 2:
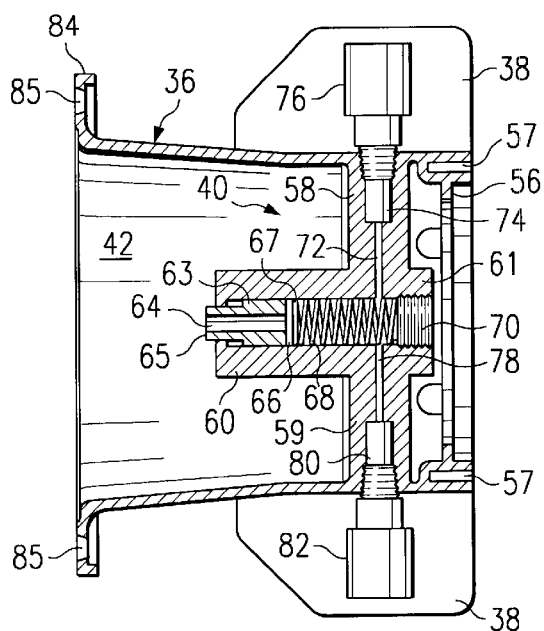
FIG. 2 is a sectional view of the rim of FIG. 1.
Figure 3:
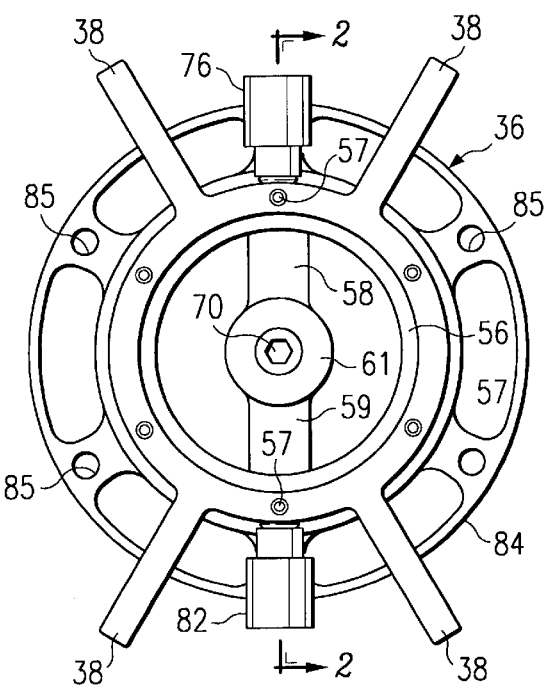
FIG. 3 is a front view of the rim of FIG. 2.
Figure 4:
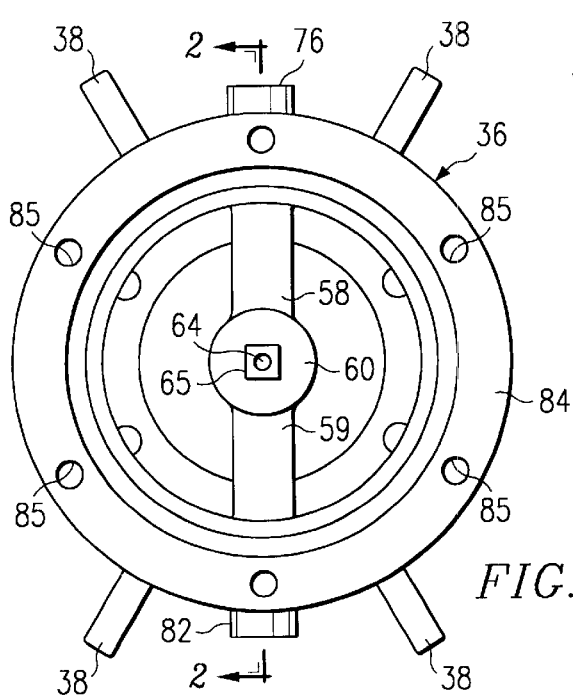
FIG. 4 is a rear view of the rim of FIG. 2.

Referring now to FIGS. 2–4 rim body 36 is depicted. Rim body 36 is generally tubular-shaped with a center or central hub portion 40 having a first radial spoke 58, a second radial spoke 59, an elongated projection 60 extending along an axial direction relative first and second spokes 58 and 59, and a short projection 61 extending along an axial direction relative first and second spokes 58 and 59 opposite elongated projection 60. Rim body 36 along with center hub portion 40 defines internal cavity 42 that is open at one end. Rim body 36 additionally includes four radially outwardly projecting fins 38 for aiding in the retention of the tires (not shown).

Elongated projection 60 has internal bore 64 with graphite 63 that retains O-ring 66 and washer 67. Positioned within internal bore 64 is spring 68 that abuts washer 67 and is retained on one end by NPT plug 70, preferably being a ⅜ NPT plug. Disposed at the end of projection 60 is a square knob 65. Extending through first spoke 58 and in communication at one end with bore 64 is first spoke bore 72.

At the other end of first spoke bore 72 is a first air filter 74 and first quick connect 76. Extending through second spoke 59 and in communication at one end with bore 64 is second spoke bore 78. At the other end of second spoke bore 78 is a second air filter 80 and second quick connect 82. Thus, there is fluid communication between cavity 42 and first and second quick connects 76 and 82. Additionally, rim body 36 includes a peripheral, radially extending skirt 84 having a plurality of mounting bores 85. Screws or the like (not shown) are used to attach rim body 36 to rotor 14 via mounting bores 85.

Figure 5:
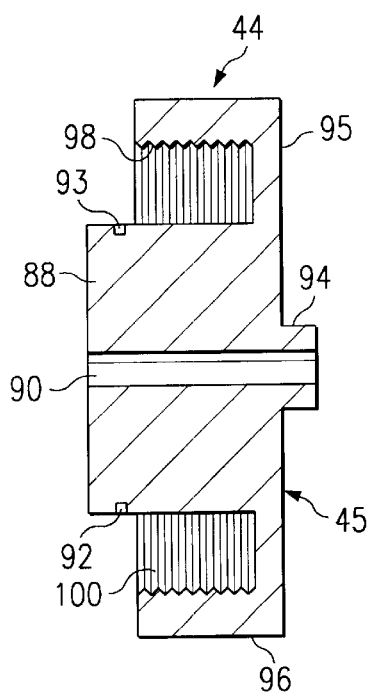
FIG. 5 is an enlarged, side sectional view of the bearing cap of the rim assembly of FIG. 1.
Figure 6:
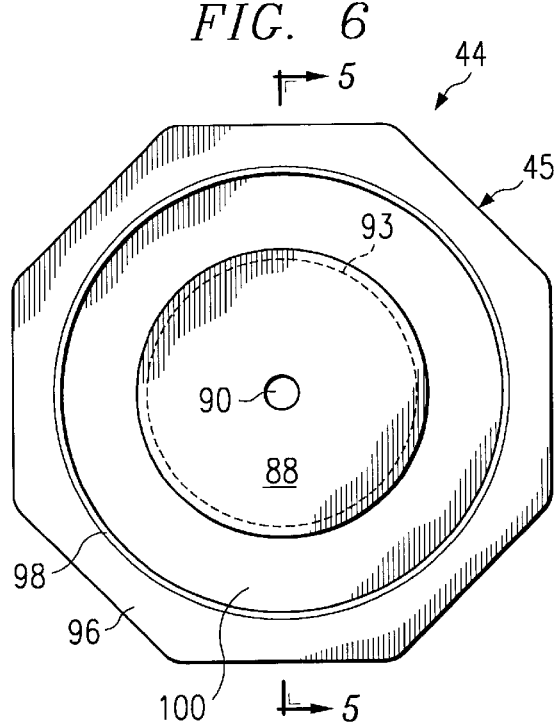
FIG. 6 is a front view of the bearing cap of FIG. 5.
Figure 7:
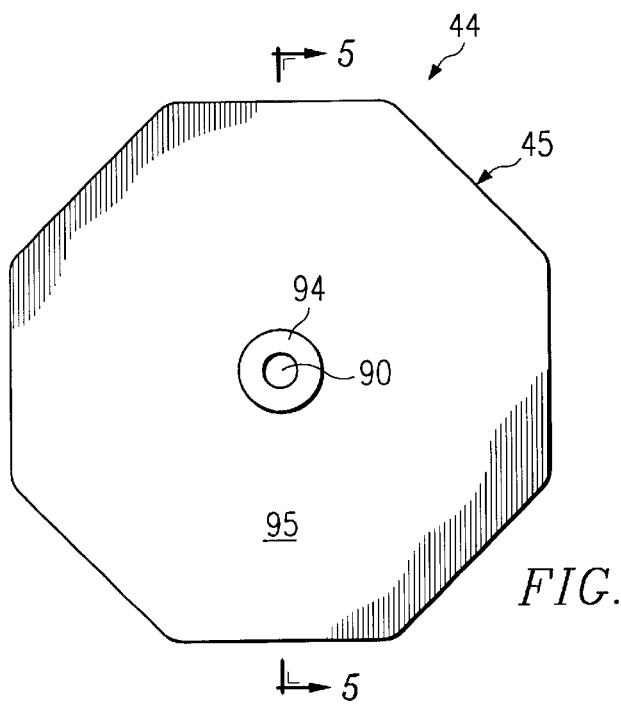
FIG. 7 is a rear view of the bearing cap of FIG. 5.

As depicted in FIG. 1, bearing or union seal cap 44 is disposed adjacent knob 65 and thus bore 64. Referring now to FIGS. 5–7 bearing or union seal cap 44 is depicted. Bearing cap 44, preferably made of a suitable metal, is defined by bearing cap body 45 of an octagonal shape. Bearing cap body 45 has center hub 88 having bore 90 therethrough and outer portion 96 that radially surrounds center hub 88. Threads 98 are disposed on an inner wall of outer portion 96 which are sized to correspond to threads 20 of axle 12. Circumferential groove 93 is disposed in an outer surface of center hub 88 which holds O-ring 92. Bearing cap body 45 further includes knob 94 on rear surface 95 through which bore 90 extends.

With reference again to FIG. 1, the manner of connection and operation of the present invention will be hereafter described. Rim body 36 is mounted to rotor 14 via studs, bolts or screws through bores 85 in peripheral skirt 84. Preferably, rim body 36 is mounted to rotor 14 via studs 81 and through bores 85 have a tapered contour to allow easy aligning and attachment therebetween. At the same time, bearing cap 44 is threadedly received onto axle end 16 such that center hub 45 is received into bore 18 of axle 12. O-ring 92 provides sealing when center hub 45 is received into bore 18. When rim body 36 is mounted to rotor 14 and bearing cap 44 is threadedly received onto axle end 16 bore 48 of bearing cap 44 is in fluid communication with bore 18 of axle 12. Additionally, knob 94 of bearing cap 44 abuts knob 65 such that bore 48 is in fluid communication with bore 64. Thus, compressed air from tank 23 flows through line 24, into pressure regulator 28, through line 32 and into axle bore 18. The compressed air then travels into bores 48 and 64, into spoke bores 72 and 78, through air-filters 74 and 80 then quick connects 76 and 82 respectively. Coupled to quick connect 74 is air conduit 77 that feeds an inner tire (not shown) of the twin tire pair such as on a tractor-trailer by connection to the valve stem (not shown) of the tire. Coupled to quick connect 82 is air conduit 83 that feeds an outer tire (not shown) of the twin tire pair such as on a tractor-trailer again by connection to the valve stem (not shown) of the tire. Since air conduits 77 and 83 are coupled to the valve stems of the mounted tires, constant air pressure may be maintained within the tires without the need for periodic checking. Of course, the principles of the present invention may be utilized for a single tire of a single rim system, or may be adapted for multiple tires.

More particularly, air conduits 77 and 83 are each connected to a quick connect assembly 110 (the quick connect assembly 110 connected with air conduit 83 being shown partially fragmented for illustration). Each quick connect assembly 110 includes mating male and female connectors, similar to conventional pneumatic fittings. However, each quick connect assembly also includes a one-way check valve 112 which only allows air to flow toward the tire. Thus, if the air pressure within the tire becomes low, the pressure differential allows higher pressure air to flow into the tire. Moreover, each quick connect assembly can be disconnected from the tire without losing pressure from within air conduit 77 or 83. Each quick connect assembly also includes a female threaded portion 114 which crews directly onto a valve stem of the tire, and a projection 116 which holds the valve within the valve stem in an open position.

Figure 8:
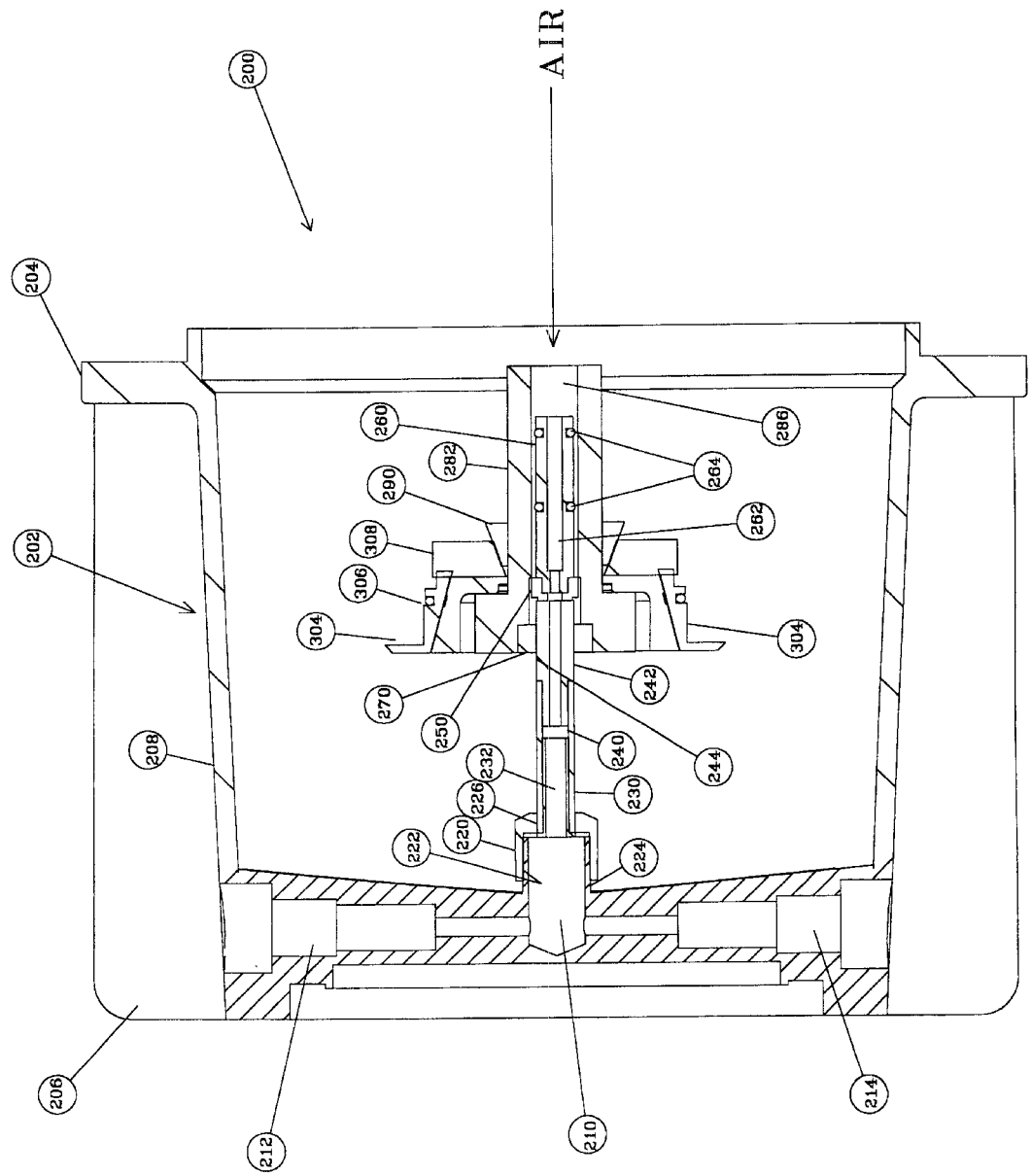
FIG. 8 is a side sectional view of a oil cap assembly having an air interface system according to a second preferred embodiment that is mountable within the hollow axle.

Referring now to FIG. 8, in view of FIG. 1, there is shown generally at 200 an on-axle tire air interface and inflation system mountable to rotor 14 according to a second preferred embodiment of the present invention. System 200 is seen to include a generally cylindrical oil cap 202 tapering from a proximal end 204 to a distal end 206 and having an annular outer surface 208 as shown. The oil cap 202 is seen to have an axially aligned passageway 210 in fluid communicating with a pair of radially extending passageways 212 and 214, as shown, for communicating compressed air from a pneumatic source 23 (see FIG. 11) to quick connect/disconnects 110.

The tire inflation system 200 according to this embodiment derives technical advantages in that the air interface device including a rotary union "RU" is sealingly disposed within the hollow axle and is thus not susceptible to damage from oil leaks or other failures of the oil cap assembly or the braking mechanism (not shown).

Figure 9:
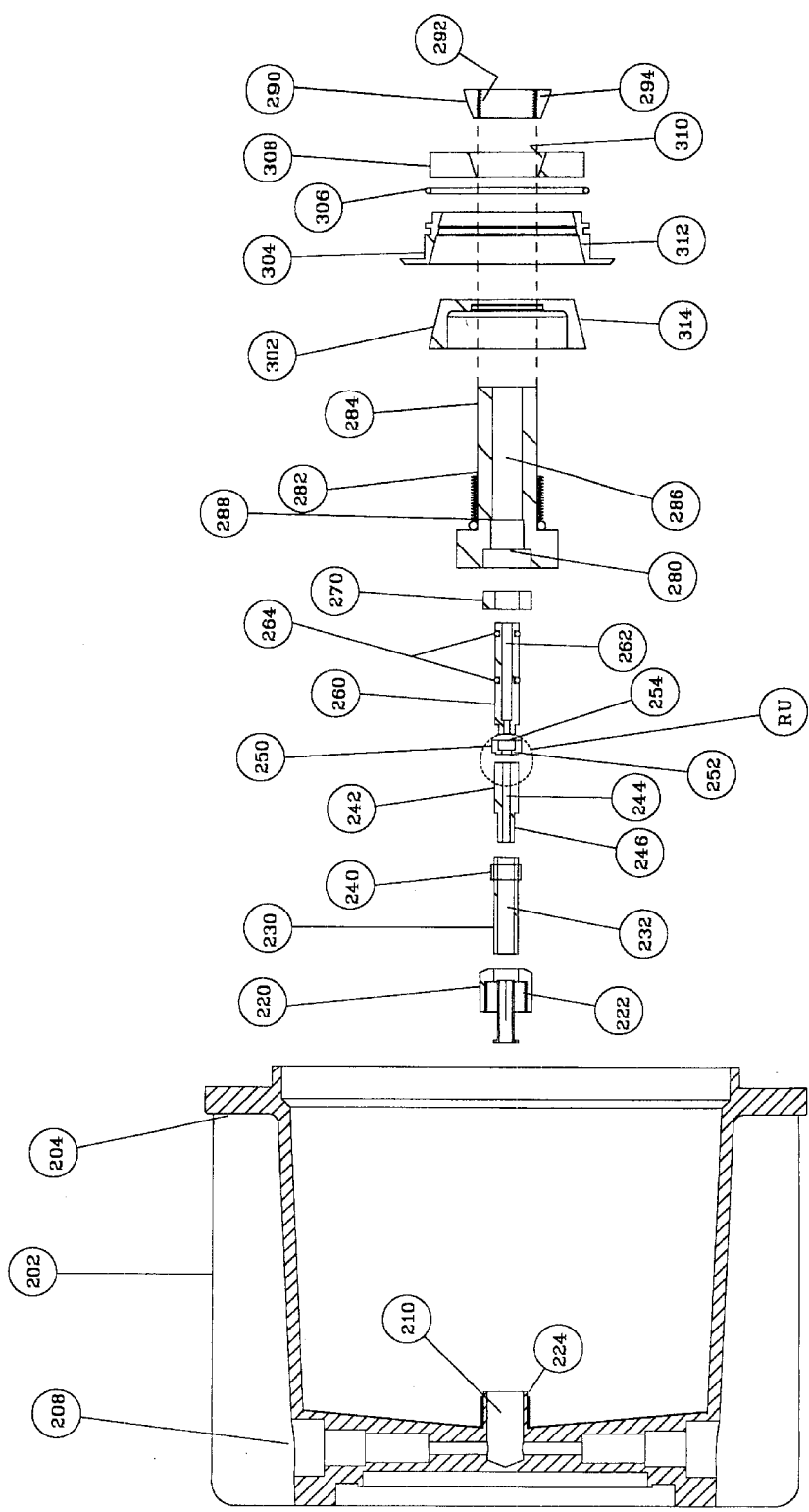
FIG. 9 is an exploded side view of all components extended for ease of component description for the embodiment shown in FIG. 8.
Figure 10:
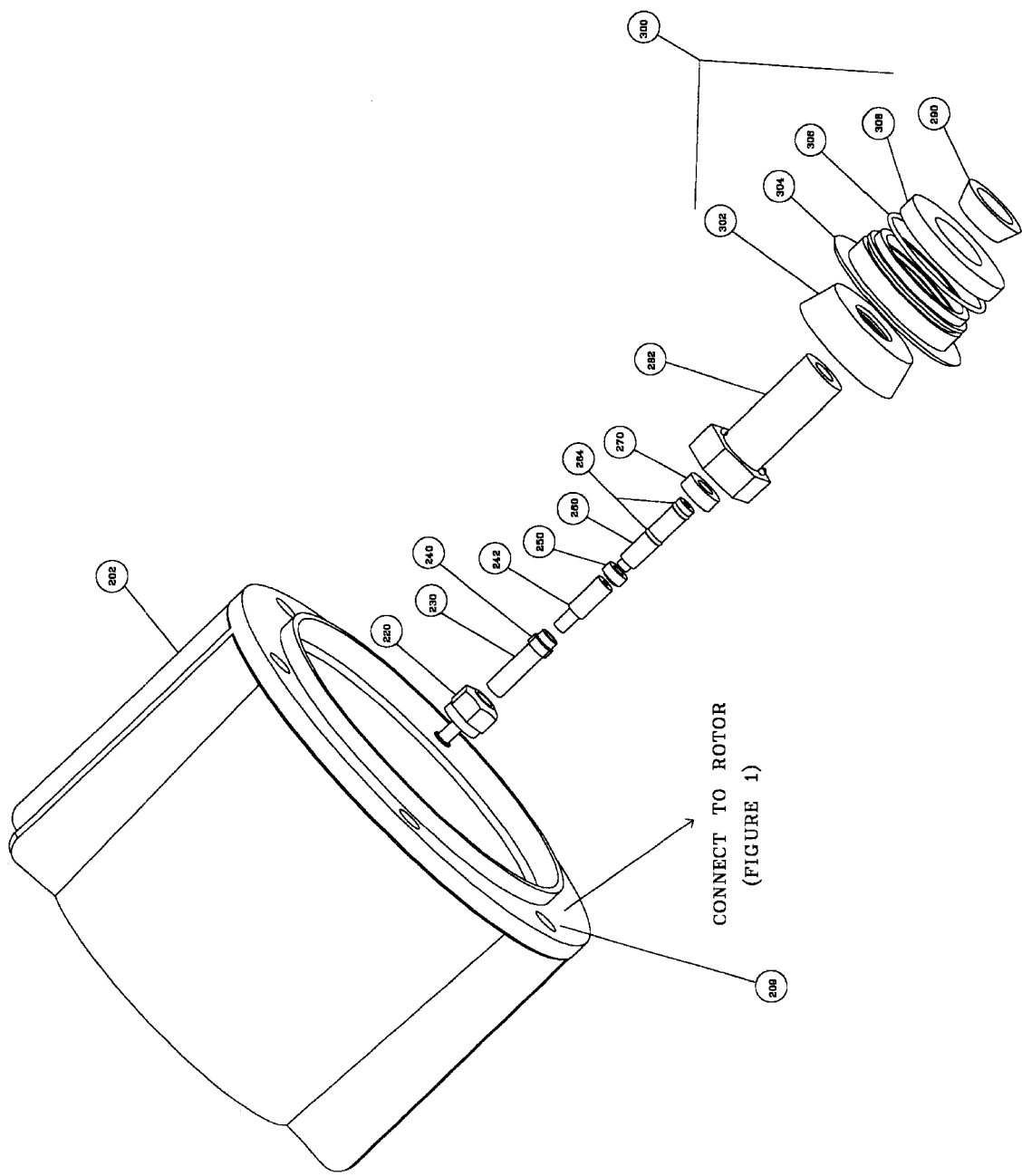
FIG. 10 is a 3-dimensional view of one side and end of the hubcap and all components interior to the hubcap and axle of the embodiment of FIG. 8.

Referring to FIG. 8 and FIG. 9, the system 200 is seen to include a compression fitting and retainer 220 having a threaded counter bore 222 threadively adapted and secured to a threaded axial member 224 extending from the inner surface of the oil cap 202 as shown. Compression fitting 220 is seen to have an axial opening 226 extending therethrough receiving in a frictional secured arrangement a flexible nylon tubing 230. Tubing 230 has a passageway 232 extending along the length thereof and is in fluid communication at one end with cavity 210 of cap 202. The inner diameter of fitting opening 226 and the outer diameter of compression sleeve 230 are both preferably about ¼ inches.

A compression sleeve 240 is seen to be secured about a proximal end of tubing 230 at proximal end thereof. A generally cylindrical rigid seal shaft 242 has an air passageway 244 extending along the length thereof, as shown. The distal end of shaft 242 is seen to have a reduced diameter portion 246 having an outer diameter such that the distal end of shaft 242 can be frictionally inserted and sealingly secured within the opening 232 of tubing 230. Shaft 242 is preferably comprises of a rigid material such as aluminum or other suitable rigid materials.

Still referring to FIG. 8 and FIG. 9, an annular carbon graphite seal 250 has a distal surface 252 adapted to abut and frictionally engage a proximal surface 254 of shaft 242. As will be discussed in more detail shortly, graphite seal 250 remains stationary and abuts against rotating shaft 242 at a Rotary Union (RU) and minimizes friction therebetween due to graphite material characteristics. The opening defined through graphite seal 250 interfaces with and communicates air pressure therethrough to the rotating shaft passageway 244. A cylindrical piston shown at 260 has a passageway 262 extending along the length thereof and a pair of O rings 264 defined in annular groves defined about piston 260. Piston 260 is seen to have a distal end of reduced diameter at 266 which securingly and sealingly is disposed within the proximal recess 254 of graphite seal 250. The O rings 264 provide a primary and secondary seal within bolt 282, and preferably have a 5/16th inch diameter as will be discussed in more detail shortly.

An annular O ring seal is shown at 270 and has a diameter such that it can be securingly and sealingly coupled about the proximal end of piston 260, and seated within a recess 280 of a threaded bolt 282. Bolt 282 is also seen to have an inner shouldered portion shown at 288 adapted to abut against the proximal surface of graphite seal 250, as shown in FIG. 8. Radial seal 270 provides an air tight seal about the proximal end of piston 260, and also an airtight seal within the distal end 280 of the bolt 282 such that air is communicated along the length thereof through the respective passageways without leaking. The proximal outer surface of bolt 280 is threaded, as shown at 284, and is adapted to threadably receive a wedge nut shown at 290. Wedge nut 290 has a threaded inner surface 292 and an annular tapered outer surface 294 tapering towards the distal end thereof.

Wedge nut 290 forms a sub-part of an axle plug assembly generally shown at 300. The other parts of the axle plug assemble 300 include a tapered plug expander 302, a flanged resilient seal 304, an O ring 306, and a wedge plate shown at 308. Wedge plate 308 has an inwardly tapered inner surface 310 commensurate with the outer tapered surface 294 of wedge nut 292, as shown. The seal 304 also has a tapered inner wall shown at 312 which is commensurate with a tapered outer surface 314 of the tapered plug expander 302. Both the tapered plug expander 302, the seal 304, the wedge plate 308 and the wedge nut 290 all have an opening axially extending therethrough to facilitate the sealed communication of pneumatic air pressure from the axle 12 to the oil cap passageways 212 and 214, as shown in the assembled view in FIG. 8.

Figure 11:
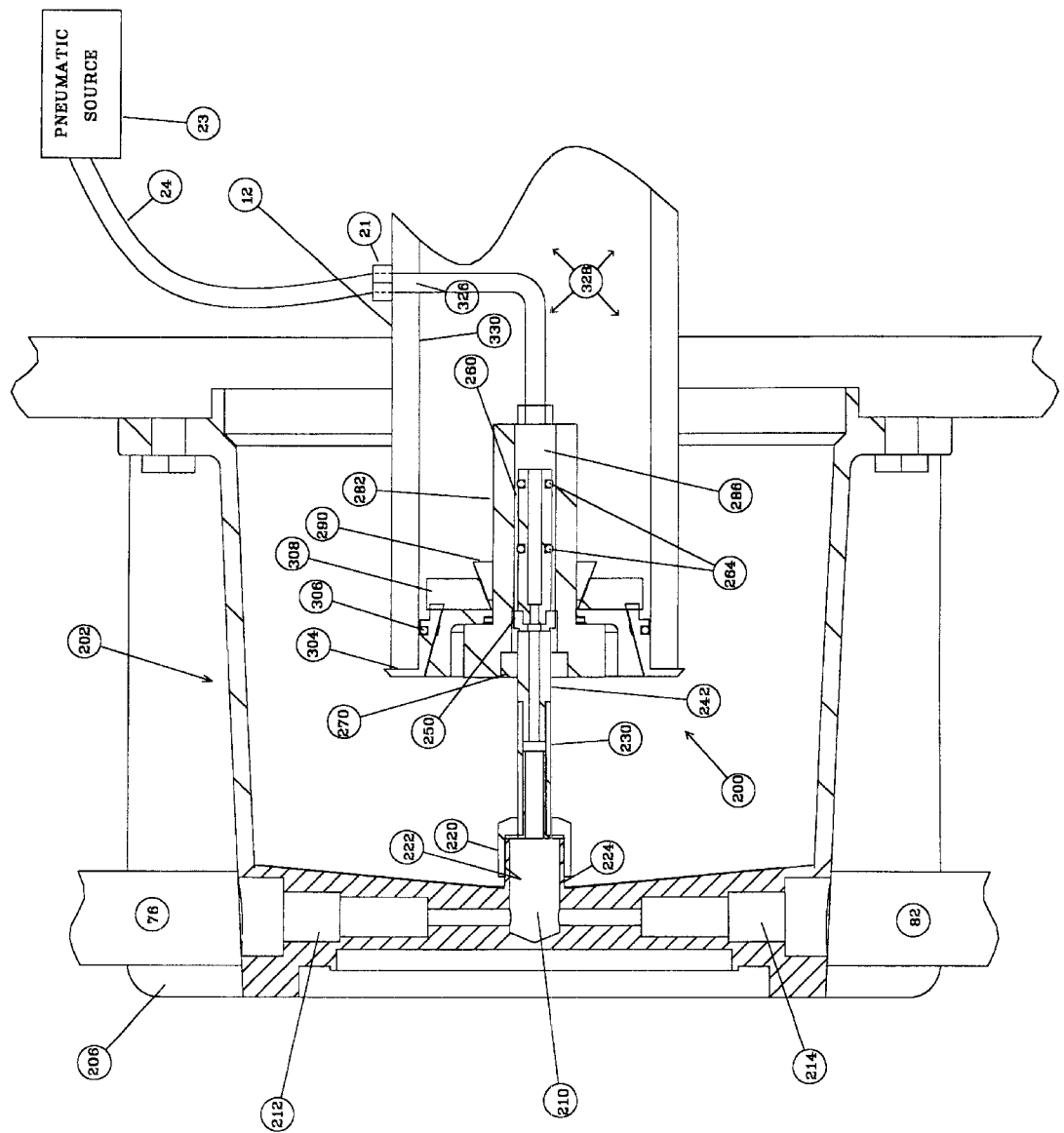
FIG. 11 is a side sectional view of the oil cap assembly mounted to a hollow axle with the rotary union being protected within the hollow axle.

Shown in FIG. 11 is the vehicle air supply system 200 receiving pressurized air from the remote air tank or reservoir 23 via the hollow axle 12. The air supply 23 is regulated to provide a supply of air at a constant pressure, manually or automatically set based on desired pneumatic tire pressure. The air output of the regulator is directed through the fitting 21 into a bore 326 in the axle 12. The air flows from the entry point near the center of the axle 12 in an outward direction toward the outer ends of the axle 12, to the assembly 200 and ultimately to the tires (not shown) via quick connect/disconnects 110.

Installation

As seen in FIGS. 8, 9, 10 and 11, components 290, 302, 304, 306 and 308 comprise the axle plug assembly 300 which provides a fixed plug at the end of the axle 12 so that air traveling through the hollow axle (from a point at the center of the axle toward the outer ends of the axle) may only escape the axle through the opening 286 in the center of bolt 282. This axle plug assembly 300 differs from other plug seals in its ease of installation.

To install the axle plug assembly 300, bolt 282 comes shipped with parts 302,304, 306 and 308 assembled on bolt 282 and with wedge nut 290 screwed loosely onto bolt 282, but fictionally in place with respect to plate 308. To install the axle plug assembly 300, the assembly 300 is inserted into the respective end of the axle 12. Bolt 282 is turned until secure within the axle 12. As bolt 282 is tightened, wedge nut 290 responsively forces wedge plate 308 to expand outwardly and create a first secure seal against the internal axle wall 330. Wedge plate 308 is also laterally forced to abut against seal 304. Seal 304 is produced from a highly expandable plastic compound such as ST 801. As wedge plate 308 is forced laterally against seal 304, bolt 282 pulls expander 302 into seal 304 and engages tapered wall 312 such that it is forced outwardly to expand over the tapered portion 302 of plug expander 302, forming a primary air seal. O-ring 306 provides a secondary airtight seal against the axle inner wall, shown at 330. The result is an easily installed, airtight and secure seal at the end of each axle 12. Air needed to inflate the tires must travel through the opening in the center of bolt 282 from the center of the axle axially toward the outer ends of the axle.

Compression fitting and retainer 220 secures the flexible nylon tubing 230 to the oil cap 202. Nylon tubing 230 is a flexible tube which provides an aid in obtaining perpendicularity between the air channel 260 entering the cap 202 and the rotary union "RU" disposed inside the axle 12, the rotary union "RU" consisting of rotating shaft 242 and carbon graphite seal 250. The flexible tube 230 helps provide an airtight seal at the rotary union "RU". When the rim 202 is installed over the end of the axle 12, the rotating shaft 242 penetrates seal 270 and is prepared to make contact with carbon graphite seal 250.

Air enters the center of the axle 12 from pneumatic source 23 via tubing 24 into chamber 328 of the axle 12. The air applies pressure to piston 260, which air pressure forces piston 260 to move axially on O-rings 264 in the direction towards the ends of the axle 12. Piston 260 ceases to move axially when the carbon rotating shaft 242 comes in contact with and abuts with graphite seal 250. The air pressure against piston 260 creates an airtight seal at the rotary union "RU". As the wheels (not shown) on the vehicle turn, the carbon graphite seal 250 remains fixed while seal shaft 242 rotates flush against the carbon graphite seal 250, while providing a sealed passageway for the air to move from the stationary axle chamber 328 to the rotating cap 202 with an airtight seal at the union "RU".

The rotary union "RU" is advantageously placed in the passageway 328 of axle 12 in order to eliminate damage to the rotary union seal "RU" from oil leaks and brake dust, or from mechanical shearing, which damage is possible with other prior devices placed on the outside of the oil cap.

Compressed air travels from an air tank or reservoir 22, through the fitting 21 at approximately the center of an axle(s) 12, through the axle bore 326, through bolt 282 permanently fixed in the end of the axle bore 12, through the rotary union members 242 and 250, and through flexible tube 230.

The compressed air then travels through passageways 212 and 214 and through air conduit 77 and 83. Coupled to air conduit 77 is the quick connect 110 that feeds an inner tire (not shown) of the twin tire pair such as on a tractor-trailer by connection to the valve stem (not shown) of the tire. Coupled to air conduit 83 is quick connect 110 that feeds an outer tire (not shown) of the twin tire pair by connection to the valve stem (not shown) of the tire. Since air conduits 77 and 83 are coupled to the valve stems of the mounted tires, constant air pressure may be maintained within the tires without the need for periodic checking. Of course, the principles of the present invention may be utilized for a single tire of a single rim system, or may be adapted for multiple tires.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A tire inflation system for a vehicle having pneumatic tires and a hollow axle having an inner wall, the tire inflation system comprising:

a first structure adapted to mount to said hollow axle and having a first opening therein adapted to fluidly communicate with said hollow axle, wherein said first structure has a securing portion adapted to be sealingly and securingly received within said hollow axle and selectively biased against said hollow axle inner wall, wherein said securing portion includes a first member by and a second member, the first member having a wedge portion adapted to selectively bias said second member radially outwardly against said hollow axle inner wall; and a second structure being rotatable with respect to said first structure at a rotary union defined therebetween and having a second opening therein in fluid communication with said first opening;

wherein said rotary union is adapted to reside inside said hollow axle when said first structure is mounted to said hollow axle.

2. The tire inflation system as specified in claim 1 wherein said second member has a tapered recess receiving said first member wedge portion.

3. The tire inflation system as specified in claim 1 wherein said securing portion further includes a third member and a fourth member, the third member being adapted to be urged against said fourth member thereby responsively causing said first member wedge portion to bias said second member outwardly and secured against to said hollow axle inner wall.

4. The tire inflation system as specified in claim 3 further comprising a bolt adapted to be disposed through said first, second, third and fourth member and threadably engage said fourth member such that rotation of said bolt with respect to said fourth member responsively urges said second member towards said axle inner wall.

5. The tire inflation system as specified in claim 4 wherein said second member is flanged and adapted to engage an end of said hollow axle.

6. The tire inflation system as specified in claim 1 wherein said second member is resilient.

7. The tire inflation system as specified in claim 1 wherein said second member has an annular seal disposed thereabout forming a second seal against said hollow axle inner wall wherein said second member is expanded thereagainst.

8. The tire inflation system as specified in claim 1 wherein said rotary union is a low friction interface.

9. The tire inflation system as specified in claim 7 wherein one of either said first structure or said second structure has a portion being comprised of graphite.

10. The tire inflation system as specified in claim 1 further comprising a piston slidingly disposed within said first structure and having a passageway therethrough.

11. The tire inflation system as specified in claim 1 wherein said first structure further including an annular graphite member interfacing said first structure with the second structure at the rotary union.

12. A tire inflation system for a vehicle having pneumatic tires and a hollow axle having an inner wall, the tire inflation system comprising:

a first structure adapted to mount to the hollow axle and having a first opening therein adapted to fluidly communicate with the hollow axle; and a second structure being rotatable with respect to the first structure at a rotary union defined therebetween and having a second opening therein in fluid communication with the first opening;

wherein the rotary union is adapted to reside inside the hollow axle when the first structure is mounted to the hollow axle, and further comprising a piston slidingly disposed within the first structure and having a passageway therethrough.

13. The tire inflation system as specified in claim 12 wherein the piston is laterally slidable within the first structure and adapted to seal against the first structure.

14. The tire inflation system as specified in claim 12 further comprising a seal disposed about the piston.

15. A tire inflation system for a vehicle having pneumatic tires and a hollow axle having an inner wall, the tire inflation system comprising:
- a first structure adapted to mount to the hollow axle and having a first end having a first opening therein adapted to fluidly communicate with the hollow axle; and
- a second structure being rotatable with respect to the first structure and having a second end abutting the first structure first end at a rotary union defined therebetween, the second end having a second opening therein in fluid communication with the first opening;

wherein the rotary union is adapted to reside inside the hollow axle when the first structure is mounted to the hollow axle.

16. The tire inflation system as specified in claim 15 wherein the first structure further including an annular graphite member interfacing the first structure with the second structure at the rotary union.

* * * * *